US006914645B2

(12) United States Patent
Kurahashi et al.

(10) Patent No.: US 6,914,645 B2
(45) Date of Patent: Jul. 5, 2005

(54) LIQUID CRYSTAL DISPLAY DEVICE

(75) Inventors: Nagatoshi Kurahashi, Mobara (JP); Kazuhiko Yanagawa, Mobara (JP); Yoshiaki Nakayoshi, Ooamishirasato (JP)

(73) Assignee: Hitachi, Ltd, Tokyo (JP)

( * ) Notice: Subject to any disclaimer, the term of this patent is extended or adjusted under 35 U.S.C. 154(b) by 35 days.

(21) Appl. No.: 10/314,152

(22) Filed: Dec. 9, 2002

(65) Prior Publication Data

US 2003/0128322 A1 Jul. 10, 2003

(30) Foreign Application Priority Data

Dec. 12, 2001 (JP) ........................................ 2001-378591

(51) Int. Cl.[7] ............................................... G02F 1/136
(52) U.S. Cl. ........................... 349/43; 349/42; 349/142; 349/143
(58) Field of Search ............................ 349/42, 43, 141, 349/143

(56) References Cited

U.S. PATENT DOCUMENTS 6,674,495 B1 * 1/2004 Hong et al. .................... 349/43
6,762,802 * 7/2004 Ono et al. ..................... 349/38

* cited by examiner

*Primary Examiner*—Robert H. Kim
*Assistant Examiner*—Richard H Kim
(74) *Attorney, Agent, or Firm*—Antonelli, Terry, Stout & Kraus, LLP (57) ABSTRACT

A liquid crystal display device in which reliable contact can be made through each through-hole includes a first conductive film, an insulating film formed to cover the first conductive film, and a second conductive film formed on an upper surface of the insulating film. The first conductive film, the insulating film and the second conductive film are formed on the liquid crystal-facing surface of at least one of substrates disposed in opposition to each other with a liquid crystal interposed therebetween. A part of the second conductive film is electrically connected to the first conductive film through a through-hole formed in the insulating film. The first conductive film has a depressed portion or recess formed in a portion thereof which is connected to the second conductive film.

9 Claims, 8 Drawing Sheets

FIG. 14B $W1 \geqq W2 > W3$

FIG. 14C $\theta 1 \leqq 90°$, $\theta 2 \leqq 90°$

LIQUID CRYSTAL DISPLAY DEVICE

BACKGROUND OF THE INVENTION

1. Field of the Invention

The present invention relates to a liquid crystal display device and, for example, to an active matrix type of liquid crystal display device.

2. Background Art

An active matrix type of liquid crystal display device includes a plurality of gate signal lines disposed in juxtaposition and a plurality of drain signal lines juxtaposed to intersect the plurality of gate signal lines on the liquid crystal-facing surface of one of substrates disposed in opposition to each other with a liquid crystal interposed therebetween. Pixel areas are made to be the areas surrounded by adjacent gate signal lines and adjacent drain signal lines.

Each of the pixel areas is provided with a switching element operated by a scanning signal from the corresponding gate signal line and a pixel electrode supplied with a video signal from the corresponding drain signal lines via the switching element.

This pixel electrode is arranged to cause electric fields to be generated between the pixel electrode and a counter electrode provided adjacently to the pixel electrode or provided on a liquid crystal-facing surface of the other substrate opposed to the pixel electrode.

These signal lines or electrodes are formed as multiple layers insulated from one another by insulating layers for providing insulation between different materials having conductivity, and conduction at the required location is provided by electrical connection through a through-hole formed in the insulating film.

SUMMARY OF THE INVENTION

However, it has been pointed out that with the recent increase in the resolution of liquid crystal display devices, the area of a contact portion obtained in each through-hole formed in an insulating film becomes smaller and a defect more easily occurs in electrical connection.

A similar problem has been pointed out in that the number of insulating films to be stacked becomes greater and hence the depth of each through-hole becomes greater than in previous types of liquid crystal display devices.

The invention has been made in view of the above-described problems, and aims to provide a liquid crystal display device in which reliable contact can be made through each through-hole.

Representative aspects of the invention described in the present application will be described below briefly.

An accordance with an embodiment of the present invention, a liquid crystal display device comprises a first conductive film, at least one insulating film formed to cover the first conductive film, and a second conductive film formed on an upper surface of the at least one insulating film, wherein the first conductive film, the at least one insulating film and the second conductive film being formed on a liquid crystal-facing surface of at least one of a pair of substrates disposed in opposition to each other with a liquid crystal layer interposed therebetween, a part of the second conductive film being electrically connected to the first conductive film through a through-hole formed in the at least one insulating film, and the first conductive film having a recess formed in a portion connected to the second conductive film.

The recess is formed by etching using as a mask the at least one insulating film in which the through-hole is formed, and the first conductive film is connected to the second conductive film at a bottom and side wall surface of the recess.

According to a feature of the present invention, the first conductive film is made of a two-layer structure, the recess being formed in an upper conductive film of the two-layer structure and a lower conductive film of the two-layer structure is made of a material having a lower electrical resistance than an electrical resistance of the upper conductive film.

An accordance with another feature of the present invention, the first conductive film is made of a three-layer structure, the recess being formed in an uppermost layer of the three-layer structure, and an intermediate layer provided between the uppermost layer and a lowermost layer being formed of a conductive layer which is lower in electrical resistance than an electrical resistance of the uppermost and lowermost layers.

The three layers of the first conductive film are formed to be progressively thicker in the order of the lowermost layer, the uppermost layer and the intermediate layer.

The lowermost layer and the uppermost layer of the first conductive film are formed of the same material.

The recess is a depressed portion formed in the first conductive film.

A liquid crystal display device, in accordance with another embodiment of the present invention, comprises on a liquid crystal-facing surface of one of a pair of substrates disposed in opposition to each other with a liquid crystal interposed therebetween, a plurality of gate signal lines disposed in juxtaposition, a plurality of drain signal lines juxtaposed to intersect the gate signal lines, pixel areas surrounded by adjacent gate signal lines and adjacent drain signal lines, each of the pixel areas having a thin film transistor enabled by a scanning signal from one of the adjacent gate signal lines, a pixel electrode being supplied with a video signal from one of the adjacent drain signal lines via the thin film transistor, at least one insulating film covering at least the pixel electrode, and a counter electrode connected to a counter voltage signal line to generate an electric field between the counter electrode and the pixel electrode, and the counter voltage signal line being formed in a lower portion of the at least one insulating film, and the counter electrode being formed in an upper portion of the at least one insulating film and being electrically connected to the counter voltage signal line through a through-hole formed in the at least one insulating film, wherein the counter voltage signal line having a recess formed in a portion thereof connected to the counter electrode.

According to a feature of the present invention, the first conductive film is made of a two-layer structure, the recess being formed in an upper conductive film of the two-layer structure, and a lower conductive film of the two-layer structure being made of a material having a lower electrical resistance than an electrical resistance of the upper conductive film.

According to another feature of the present invention, the first conductive film is made of a three-layer structure, the recess being formed in an uppermost layer of the three-layer structure and an intermediate layer between the uppermost layer and a lowermost layer being formed of a conductive layer lower in electrical resistance than the uppermost and lowermost layers.

The three layers of the first conductive film are formed to be progressively thicker in the order of the lowermost layer, the uppermost layer and the intermediate layer.

The lowermost layer and the uppermost layer of the first conductive film are formed of the same material.

The recess is a depressed portion formed in the first conductive film.

A liquid crystal display device, according to a feature embodiment of the present invention, comprises a conductive layer having a three-layer structure made of a first layer, a second layer and a third layer stacked in this order from a liquid crystal-facing surface of at least one of substrates disposed in opposition to each other with a liquid crystal interposed therebetween, an insulating film formed to cover the conductive layer, and the conductive layer and the insulating film being formed on the liquid-crystal-side surface of the at least one of the substrates, wherein the third layer of the conductive layer being formed to be smaller in width than a width of the first layer, the second layer having a tapered shape with a width which changes in a direction from the first layer to the third layer, and the first layer being formed to make an angle of not greater than 90° at a side wall of the taper of the first layer with the liquid-crystal-side surface of the substrate.

The third layer of the conductive layer has a greater dry-etching resistance than a dry-etching resistance of the first layer, the first layer having a greater wet-etching resistance than a wet-etching resistance of the third layer.

The first layer is formed of MoCr, the second layer is formed of Al or an alloy thereof, and the third layer is formed of MoZr.

An accordance with another embodiment of the present invention, the liquid crystal display device comprises a plurality of gate signal lines disposed in juxtaposition, a plurality of drain signal lines juxtaposed to intersect the gate signal lines, pixel areas surrounded by adjacent gate signal lines and adjacent drain signal lines, each of the pixel areas having a thin film transistor enabled by a scanning signal from one of the adjacent gate signal lines, a pixel electrode being supplied with a video signal from one of the adjacent drain signal lines via the thin film transistor, at least one insulating film covering at least the pixel electrode, and a counter electrode connected to a counter voltage signal line to generate an electric field between the counter electrode and the pixel electrode, and the counter voltage signal line being formed in a lower portion of the at least one insulating film, and the counter electrode being formed in an upper portion of the at least one insulating film and being electrically connected to the counter voltage signal line through a through-hole formed in the at least one insulating film, wherein at least one of the gate signal lines and the drain signal lines or both of the gate signal lines and the drain signal lines are formed by the conductive layer having the three-layer structure.

The invention is not limited to any of the above-described constructions, and can be modified in various ways without departing from the technical idea of the invention.

BRIEF DESCRIPTION OF THE DRAWINGS

The invention will become more readily appreciated and understood from the following detailed description of preferred embodiments of the invention when taken in conjunction with the accompanying drawings, in which.

DETAILED DESCRIPTION

Embodiments of the liquid crystal display device according to the invention will be described below with reference to the accompanying drawings.

Embodiment 1

<<Entire Construction of Liquid Crystal Display Device>>

Figure 2:
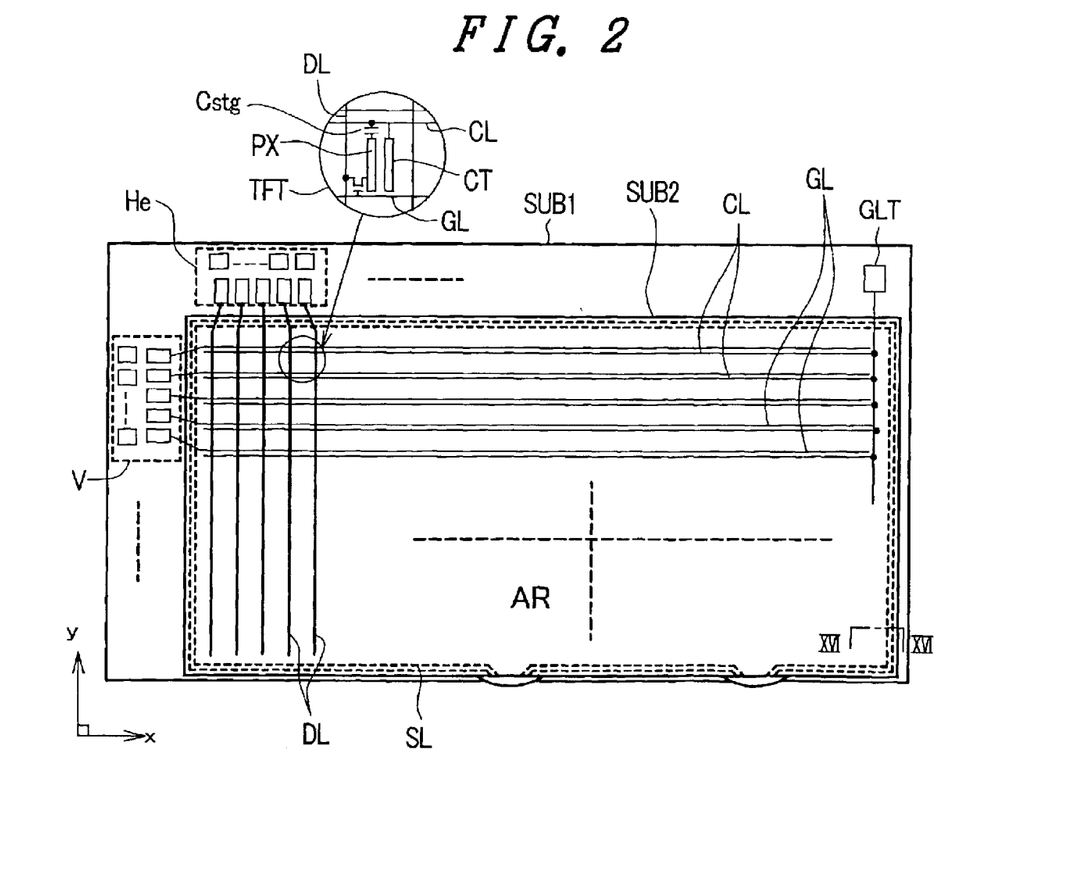
FIG. 2 is a diagrammatic view showing the entire construction of one embodiment of the liquid crystal display device according to the invention.

FIG. 2 is a diagrammatic view showing the entire construction of Embodiment 1 of the liquid crystal display device according to the invention. FIG. 2 is an equivalent circuit diagram which is depicted to correspond to the actual geometrical arrangement of the liquid crystal display device.

In FIG. 2, there are shown a pair of transparent substrates SUB1 and SUB2 which are disposed in opposition to each other with a liquid crystal interposed therebetween. The liquid crystal is sealed by a sealing material SL which also serves to secure the transparent substrate SUB1 to the transparent substrate SUB2.

Gate signal lines GL and drain signal lines DL are formed in the area surrounded by the sealing material SL on the liquid crystal-facing surface of the transparent substrate SUB1. The gate signal lines GL are disposed to be extended in the x direction and to be juxtaposed in the y direction as viewed in FIG. 2, while the drain signal lines DL are disposed to be extended in the y direction and to be juxtaposed in the x direction as viewed in FIG. 2.

Areas each of which is surrounded by adjacent gate signal lines GL and adjacent drain signal lines DL constitute pixel areas, respectively, and a matrix-form aggregation of these pixel areas constitutes a liquid crystal display part AR.

Counter voltage signal lines CL each of which is common to pixel areas juxtaposed in one row in the x direction are formed to run through the pixel areas along the respective rows. Each of the counter voltage signal lines CL serves as a signal line for supplying a voltage which serves as a reference for a video signal to a counter electrode CT (to be described later) of each of the pixel areas.

A thin film transistor TFT and a pixel electrode PX are formed in each of the pixel areas. The thin film transistor TFT is operated by a scanning signal from one of the adjacent gate signal lines GL, and the pixel electrode PX is supplied with a video signal from one of the adjacent drain signal lines DL via this thin film transistor TFT.

This pixel electrode PX is arranged to generate an electric field between the pixel electrode PX and the counter electrode CT connected to the counter voltage signal line CL, and the optical transmissivity of the liquid crystal is controlled by this electric field. One end of each of the gate signal lines GL is extended beyond the sealing material SL, and the extended end constitutes a terminal to which an output terminal of a vertical scanning driver circuit V is connected. Signals from a printed circuit board which is disposed outside a liquid crystal display panel are inputted to input terminals of the vertical scanning driver circuit V.

The vertical scanning driver circuit V is made of a plurality of semiconductor devices. Mutually adjacent gate signal lines GL form groups, and one of the above semiconductor devices is assigned to each group.

Similarly, one end of each of the drain signal lines DL is formed to be extended beyond the sealing material SL, and the extended end constitutes a terminal to which an output terminal of a video signal driver circuit He is connected. Signals from a printed circuit board which is disposed outside the liquid crystal display panel are inputted to input terminals of the video signal driver circuit He.

The video signal driver circuit He is made of a plurality of semiconductor devices. Mutually adjacent drain signal lines DL form groups, and one semiconductor device is assigned to each group.

The counter voltage signal lines CL each of which is common to the pixel areas juxtaposed in each row in the x direction are connected to a common connection line at their right-hand ends as viewed in FIG. 2. The connection line is formed to be extended beyond the sealing material SL, and constitutes a terminal CLT at its extended end. The voltage which serves as a reference for a video signal is supplied from this terminal CLT.

Each one of the gate signal lines GL is sequentially selected by a scanning signal from the vertical scanning driver circuit V.

In addition, a video signal is supplied to each of the drain signal lines DL by the video signal driver circuit He in synchronism with the timing of selection of each one of the gate signal lines GL.

In the above-described embodiment, both the vertical scanning driver circuit V and the video signal driver circuit He are made of a plurality of semiconductor devices mounted on the transparent substrate SUB1, but may also be made of, for example, semiconductor devices of a so-called tape carrier package type which are connected between the transparent substrate SUB1 and the corresponding printed circuit board. In addition, in the case where the semiconductor layer of the thin film transistor TFT is made of polycrystalline silicon (p-Si), such a semiconductor device made of polycrystalline silicon may be formed together with the wiring layer.

<<Construction of Pixel>>

Figure 1:
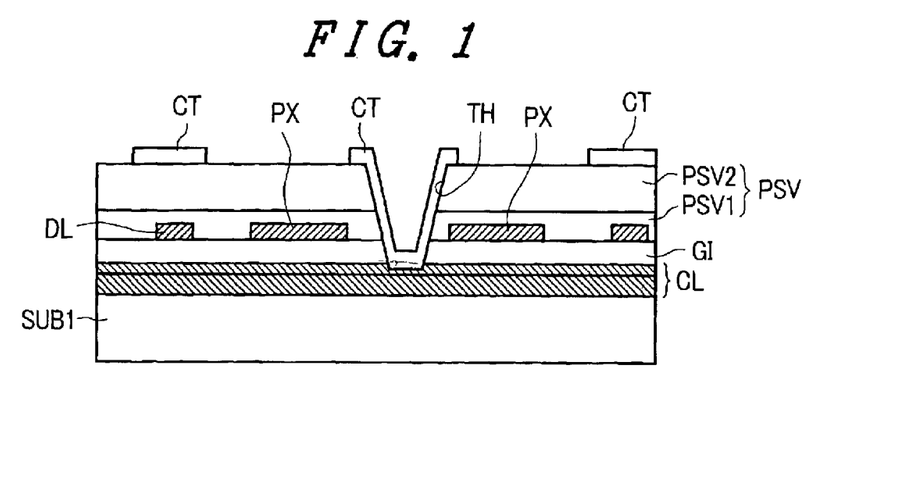
FIG. 1 is a cross-sectional view taken along line I—I of FIG. 3, showing one embodiment of a pixel of a liquid crystal display device the invention.
Figure 3:
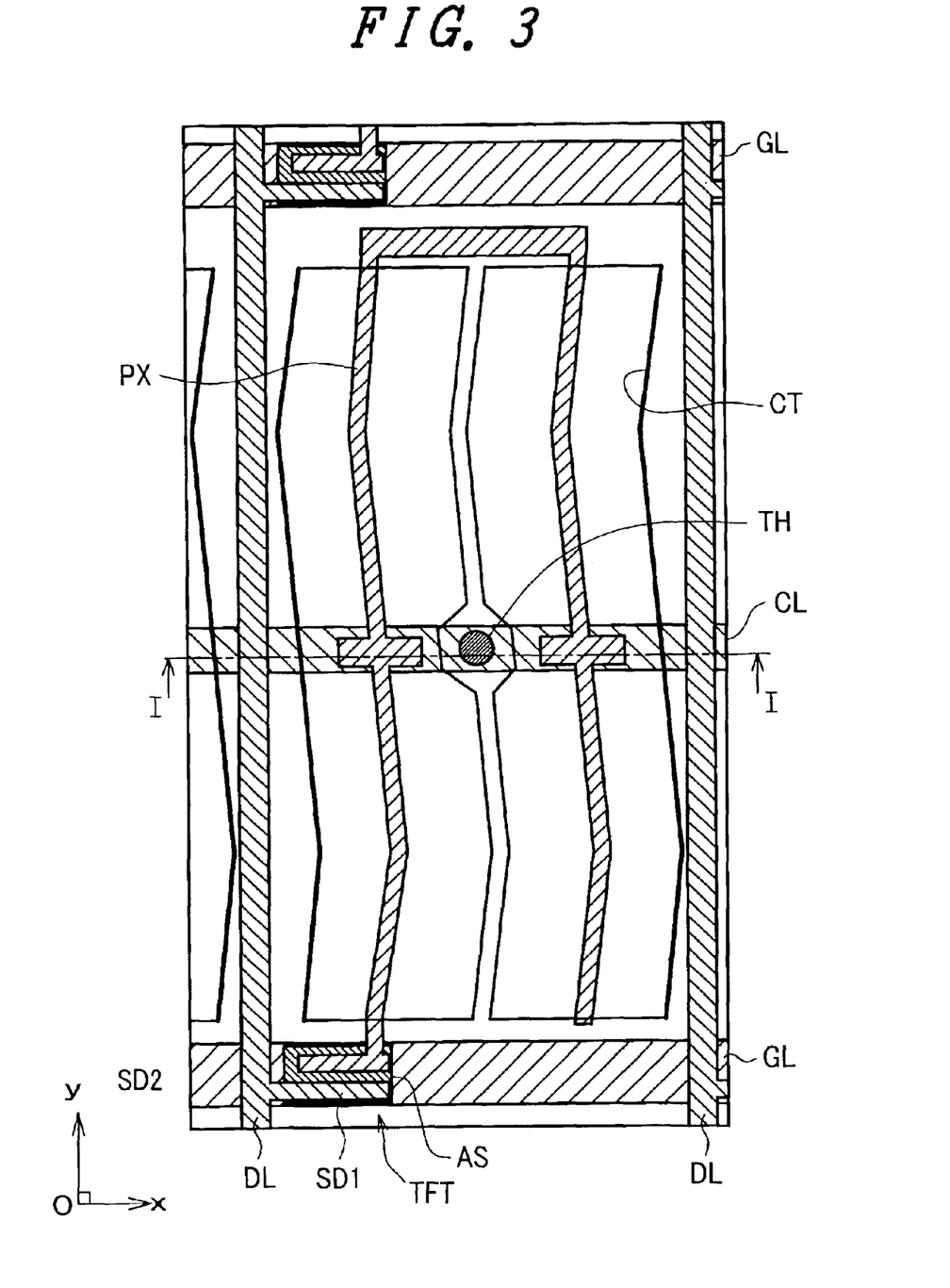
FIG. 3 is a plan view showing one embodiment of the pixel of the liquid crystal display device according to the invention.

FIG. 3 is a plan view showing one embodiment of the above-described pixel area, and FIG. 1 is a cross-sectional view taken along line I—I of FIG. 3.

As shown in FIGS. 1 and 3, a pair of gate signal lines GL which are disposed to be extended in the x direction and to be juxtaposed in the y direction are formed on the liquid-crystal-side surface of the transparent substrate SUB1.

These gate signal lines GL and a pair of drain signal lines DL which will be described later surround a rectangular area so that this rectangular area is constructed as a pixel area.

A counter voltage signal line CL which is disposed to run in parallel with the gate signal lines GL is formed approximately in the middle of the pixel area. This counter voltage signal line CL is formed at the same time as, for example, the formation of the gate signal lines GL.

An insulating film GI made of, for example, SiN is formed to cover the gate signal lines GL and other lines on the surface of the transparent substrate SUB1 on which the gate signal lines GL and the counter voltage signal lines CL are formed in the above-described manner.

This insulating film GI has the function of an interlayer insulating film between the gate signal lines GL and the drain signal lines DL in an area in which the drain signal lines DL (to be described later) are formed, and the function of a gate insulating film for a thin film transistor TFT (to be described later) in an area in which the thin film transistor TFT is formed.

A semiconductor layer AS made of, for example, amorphous Si is formed on a surface of the insulating film GI in such a manner as to overlap a part of the gate signal lines GL.

This semiconductor layer AS constitutes the semiconductor layer of the thin film transistor TFT, and a drain electrode SD1 and a source electrode SD2 are formed on the upper surface of the semiconductor layer AS, thereby forming a reversed staggered structure MIS transistor which uses a part of the gate signal line GL as its gate electrode.

The drain electrode SD1 and the source electrode SD2 are formed at the same time as the formation of the drain signal line DL.

Specifically, the drain signal lines DL which are disposed to be extended in the y direction and to be juxtaposed in the x direction as viewed in FIG. 3 are formed, and a part of each of the drain signal lines DL is formed to be extended onto the upper surface of the semiconductor layer AS to form the drain electrode SD1. The source electrode SD2 is formed to be spaced apart from the drain electrode SD1 by a distance equivalent to the channel length of the thin film transistor TFT.

This source electrode SD2 is formed integrally with the pixel electrode PX formed within the pixel area.

Specifically, the pixel electrode PX is made of a plurality of (in FIG. 3, two) pixel electrodes which are disposed to be extended in the y direction and to be juxtaposed in the x direction within the pixel area. One end of one of the pixel electrodes PX serves as the source electrode SD2, and the other end is electrically connected to another of the pixel electrodes PX at an area between the two.

Although not shown, a thin layer doped with high concentrations of impurities is formed at the interface between the semiconductor layer AS and each of the drain electrode SD1 and the source electrode SD2. This layer functions as a contact layer.

This contact layer can be formed, for example, by the process of forming a high-concentration impurity layer on the surface of the semiconductor layer AS during the formation of the semiconductor layer AS, and etching portion of the impurity layer exposed with a mask with the pattern of the drain electrode SD1 and the source electrode SD2 formed on the upper surface of the high-concentration impurity layer. A protective film PSV which is made of an organic material layer such as resin is formed on the surface of the transparent substrate SUB1 on which the thin film transistors TFT, the drain signal lines DL, the drain electrodes SD1, the source electrodes SD2 and the pixel electrodes PX are formed in the above-described manner. This protective film PSV serves as a film for avoiding direct contact between the thin film transistors TFT and the liquid crystal, and prevents the characteristic degradation of the thin film transistors TFT.

This protective film PSV is made of a layer made of an organic material such as resin or a stacked structure in which a layer made of an inorganic material such as SiN and a layer made of an organic material such as resin are stacked alternately. In Embodiment 1, the protective film PSV is made of a protective film PSV1 made of an organic material layer and a protective film PSV2 made of an inorganic material layer are stacked alternately.

The purpose for which at least the organic material layer is used as the protective film PSV is to decrease the dielectric constant of the protective film PSV itself.

The counter electrode CT is formed on the upper surface of the protective film PSV. Similarly to the pixel electrode PX, the counter electrode CT is made of a plurality of (in FIG. 3, three) electrodes which are disposed to be extended in the y direction and to be juxtaposed in the x direction, and in plan view, each of the electrodes is positioned between adjacent pixel electrodes PX.

Specifically, the counter electrodes CT and the pixel electrodes PX are disposed at equal intervals in the order of counter electrode, pixel electrode, counter electrode, pixel electrode, . . . , and counter electrode from one of the drain signal line DL to the next drain signal line DL.

The counter electrodes CT which are respectively disposed on the opposite extreme sides of the pixel area are formed to be partly superposed on the respective drain signal lines DL, and are formed to be used jointly by adjacent pixel areas.

In other words, each of the counter electrodes CT is superposed on the corresponding drain signal lines DL so that their central axes approximately coincide with each other, and the width of each of the counter electrodes CT is formed to be larger than that of each of the drain signal lines DL. The counter electrode CT that is located on the left side of each of the drain signal lines DL constitutes one of the counter electrodes CT of the pixel area to the left as viewed in FIG. 3, while the counter electrode CT that is located on the right side of each of the drain signal lines DL constitutes one of the counter electrodes CT of the pixel area to the right as viewed in FIG. 3.

The construction in which the counter electrodes CT are wider than the drain signal lines DL and are respectively formed over the drain signal lines DL in the above-described manner serves the advantage that lines of electric force from the drain signal lines DL are made to terminate at the counter electrodes CT so that the lines of electric force can be prevented from terminating at the pixel electrode PX. If the lines of electric force from the drain signal lines DL terminate at the pixel electrode PX, they will produce noise.

In this case, the protective film PSV2 made of the organic material layer is interposed between the respective drain signal lines DL and the overlying counter electrodes CT, whereby it is possible to reduce parasitic capacitances which occur between the respective drain signal lines DL and the overlying counter electrodes CT.

Each of the counter electrodes CT is formed of the same material as and integral with a conductive film formed to fully cover the gate signal lines GL.

One of the counter electrodes CT within the pixel area is connected to the counter voltage signal line CL through a through-hole TH formed to extend through the protective film PSV2, the protective film PSV1 and the insulating film GI.

The connection structure of the counter voltage signal line CL and the counter electrode CT through the through-hole TH will be described later.

The reason why the counter voltage signal lines CL are formed in the above-described manner is that in the case where an optically transmissive material such as ITO (Indium Tin Oxide), ITZO (Indium Tin Zinc Oxide) or IZO (Indium Zinc Oxide) is used as the material of the counter electrodes CT, the electrical resistance of the optically transmissive material is large, so that interconnection lines having small electrical resistance need to be formed separately from the counter electrodes CT.

The portions of the pixel electrode PX that are superposed on the counter voltage signal line CL have comparatively large areas, respectively, whereby a capacitance element Cstg, which uses the protective films GI as its dielectric films, is formed between the pixel electrode PX and the counter voltage signal line CL.

This capacitance element Cstg has, for example, the function of storing a video signal supplied to the pixel electrode PX for a comparatively long time.

An alignment film (not shown) is formed to cover the counter electrodes CT on the upper surface of the transparent substrate SUB1 on which the counter electrodes CT are formed in the above-described manner. This alignment film is a film which is in direct contact with the liquid crystal, and serves to determine the initial alignment direction of molecules of the liquid crystal by means of rubbing this film on the surface of the alignment layer.

Both the pixel electrode PX and the counter electrode CT have a zigzag shape made of a plurality of bends formed along the running direction thereof; that is to say, a so-called multi domain scheme is adopted.

The state of polarization of transmitted light varies according to the incident direction of light on the liquid crystal display panel even if the molecular arrangement of the liquid crystal is the same, so that the transmissivity of light varies according to the incident direction.

Such viewing-angle dependence of the liquid crystal display panel has a display characteristic in which if an observer inclines his viewing point obliquely from the direction of a viewing angle, the phenomenon of brightness reversal is caused and an image is tinted in the case of color display.

For this reason, the pixel electrode PX is formed in a pattern having at least one bend formed along the extending direction of the pixel electrode PX, and further, the counter electrode CT is formed in the same shape shifted in parallel, whereby the directions of electric fields acting between the electrodes PX and CT are made different between one region and another region, the boundaries between these regions being the lines connecting the bending points of the respective electrodes PX and CT, thereby compensating for the tinting of an image depending on viewing angles.

<<Construction of Contact Portion>>

Figures 4, 5:
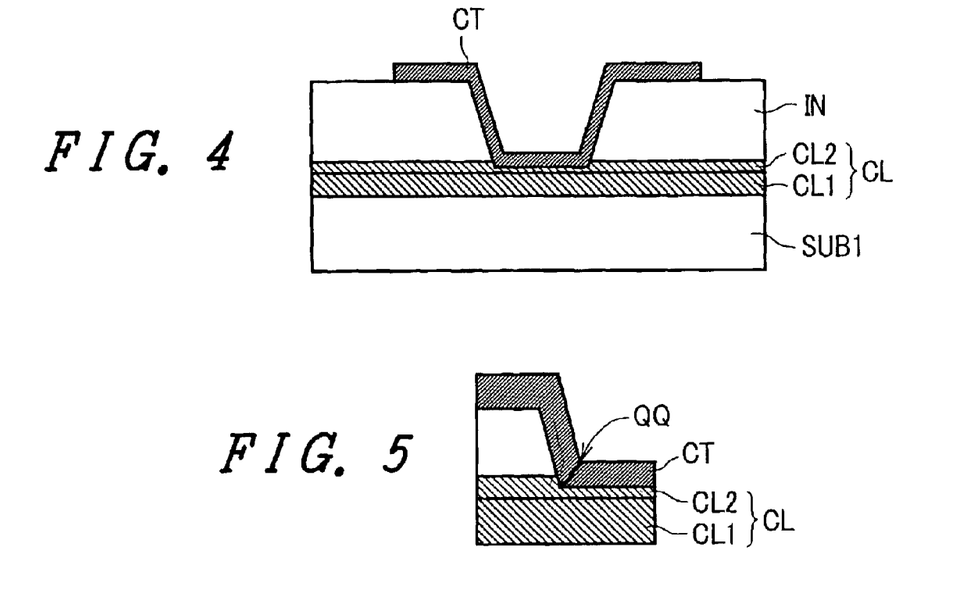
FIG. 4 is an enlarged view of a through-hole portion of the pixel of the liquid crystal display device according to the invention.
FIG. 5 is an explanatory view showing an advantage of the invention.

FIG. 4 is an enlarged view showing the portion of connection between the counter voltage signal line CL and the counter electrode CT through the through-hole TH shown in FIG. 1.

A distinctive construction of the contact portion shown in FIG. 4 is that a depressed portion or recess is formed in an exposed portion of the counter voltage signal line CL (having a two-layer structure made of layers CL1 and CL2) in the through-hole TH formed to extend through an insulating film IN (the protective film PSV2, the protective film PSV1 and the insulating film GI).

This depressed portion or recess is formed, for example by dry etching or wet etching via the insulating film IN (the protective film PSV2, the protective film PSV1 and the insulating film GI) in which the through-hole TH is formed.

The counter electrode CT formed on the upper surface of the insulating film IN is covered with the side wall surface of the through-hole TH and the surface of the counter voltage signal line CL exposed in the through-hole TH (the surface of the counter voltage signal line CL on which the depressed portion is formed), whereby the counter electrode CT is electrically connected to the counter voltage signal line CL.

According to this construction, the counter electrode CT can be electrically connected to the counter voltage signal line CL with high reliability.

Specifically, as shown in FIG. 5, the counter electrode CT has a bend in a portion extending from the side wall surface of the through-hole TH to the portion of the counter voltage signal line CL exposed at the bottom of the through-hole TH. A step disconnection QQ easily occurs at this bend. This step disconnection QQ occurs more easily as the diameter of the through-hole TH becomes smaller or the thickness of the insulating film IN becomes larger.

Figure 6:
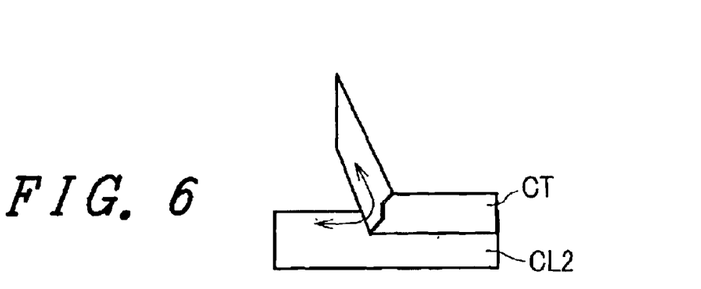
FIG. 6 is an explanatory view showing an advantage of the invention.

However, as shown in FIG. 6, the step disconnection QQ tends to concentrate in the boundary portion between the bottom and the side wall surface of the depressed portion or recess formed in the counter voltage signal line CL, and even if the step disconnection QQ occurs, the counter electrode CT is formed so that it reliably adheres to the side wall surface of the depressed portion. In other words, since the upper layer CL2 is in contact with the counter electrode CT, a sufficient amount of current is allowed to flow as shown by a double-headed arrow in FIG. 6 in a portion where the counter electrode CT adheres to the side wall surface of the depressed portion, whereby electrical connection is ensured.

Figure 7:
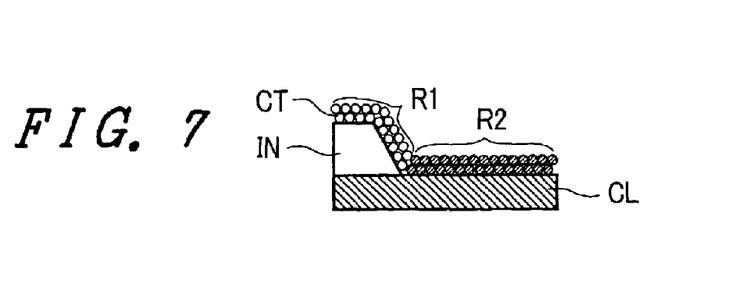
FIG. 7 is an explanatory view showing a problem occurring in a case where the invention is not applied.

FIG. 7 shows the reason why the step disconnection QQ occurs in the counter electrode CT at the bend between the side wall surface of the through-hole TH and the portion of the counter voltage signal line CL exposed at the bottom of the through-hole TH, during the formation of the counter electrode CT.

Figure 8:
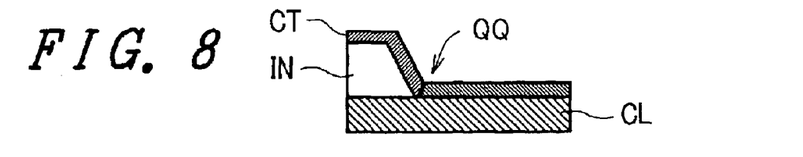
FIG. 8 is an explanatory view showing a problem occurring in a case where the invention is not applied.

In FIG. 7, the layer of the counter electrode CT is shown as an aggregation of a multiplicity of particles, and particles R1 deposited on the side wall surface of the through-hole TH and particles R2 deposited on the surface of the counter voltage signal line CL exhibit a difference between their growth speeds according to the difference between the materials of layers underlying the particles R1 and R2, and as shown in FIG. 8, the step disconnection QQ occurs due to a crack produced by the difference. At the step disconnection QQ, an increase in connection resistance due to defective conduction or partial contact easily occurs.

The depressed portion or recess formed in the portion of the counter voltage signal line CL exposed in the through-hole TH needs only to be 1 nm deep, and it has also been confirmed that if the depressed portion is made deeper, the reliability of the device is further improved. Even if a step disconnection occurs in the counter electrode CT, the counter electrode CT can be connected to the counter voltage signal line CL through a portion of sectional area obtained by multiplying the length of the circumference of the bottom of the through-hole TH by 1 nm.

In addition, since the probability that the step disconnection QQ occurs is, as described above, influenced by the thickness of the insulating film IN interposed between the counter voltage signal line CL and the counter electrode CT, the depth of the depressed portion or recess formed in the counter voltage signal line CL may also be made not smaller than, for example, $\frac{1}{10}$ of the thickness of the insulating film GI to achieve a further improvement in the above-described advantage.

Embodiment 2

In the description of Embodiment 1, although the shown counter voltage signal line CL has the two-layer structure, the description of the counter voltage signal line CL has been made on the basis of a single-layer structure because the above-described advantages can be similarly obtained whether or not the counter voltage signal line CL has a multiple-layer structure.

However, in the case of the two-layer structure, a material capable of providing good contact may be selected as the material of the upper layer CL2 which enables connection to the counter electrode CT, and a material having small electrical resistance may be selected as the lower layer CL1.

FIGS. 9A to 9I are process diagrams showing one embodiment of a manufacturing method for forming the above-described connection portion. The manufacturing method will be described below in the order of execution of processes.

Figure 9A:
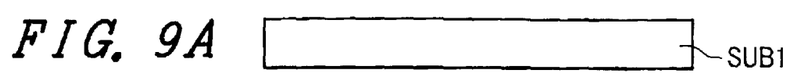
FIGS. 9A to 9I are process diagrams showing one embodiment of a manufacturing method for forming the liquid crystal display device according to the invention.

Process 1 (FIG. 9A)

A transparent substrate SUB1 is prepared.

Figure 9B:
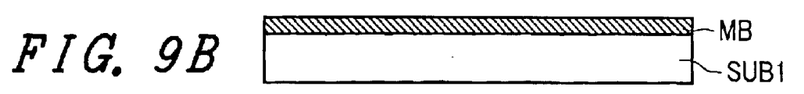

Process 2 (FIG. 9B)

A lower metal layer MB of the counter voltage signal line CL is formed on the main surface of the transparent substrate SUB1.

Figure 9C:
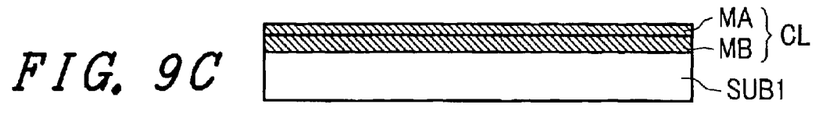

Process 3 (FIG. 9C)

An upper metal layer MA of the counter voltage signal line CL is formed on the main surface of the metal layer MB. Then, the metal layers MB and MA are patterned by a selective etching method using photolithography techniques, thereby forming the counter voltage signal line CL.

Figure 9D:
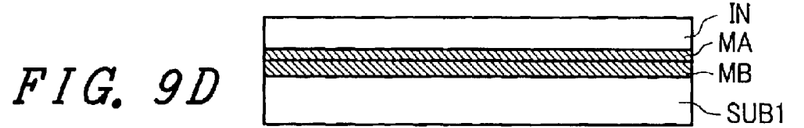

Process 4 (FIG. 9D)

An insulating film IN is formed to cover the counter voltage signal line CL and others on the transparent substrate SUB1.

Figure 9E:
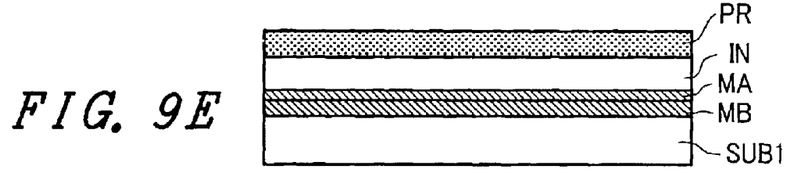

Process 5 (FIG. 9E)

A photoresist film PR is formed on the upper surface of the insulating film IN, and a hole is formed by applying selective exposure and development to the photoresist film PR. This hole is formed in a portion where a through-hole TH is to be formed.

Figure 9F:
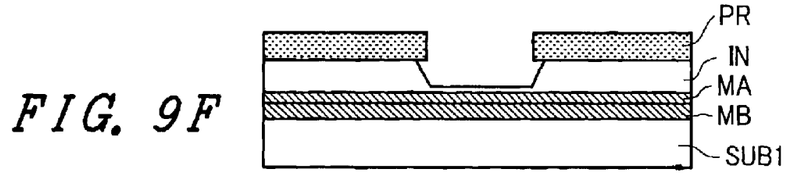

Process 6 (FIG. 9F)

The portion of the insulating film IN that is exposed by the hole of the photoresist film PR is dry-etched, thus using the photoresist film PR as a mask.

Figure 9G:
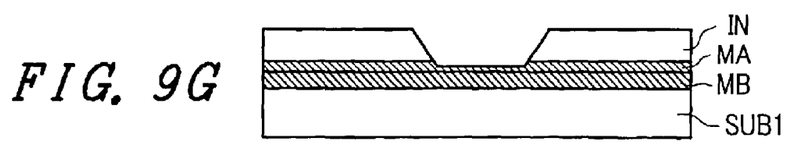

Process 7 (FIG. 9G)

The metal layer MA underlying the insulating film IN is exposed to form the through-hole TH in the insulating film IN, and drying etching is further continued to form a depressed portion in the metal layer MA. After the depressed portion has been formed, photoresist film PR is removed.

Figure 9H:
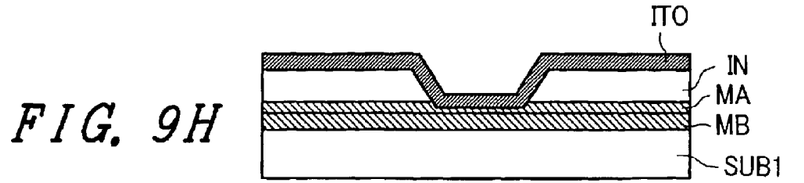
Figure 9I:
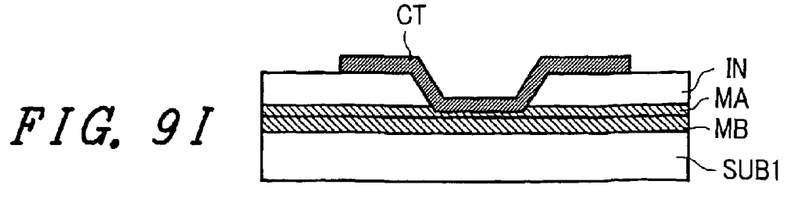

Process 8 (FIG. 9H)

A film of for example ITO is formed to cover the through-hole TH and others on the insulating film IN.

Process p (FIG. 9F)

The ITO film is patterned with a selective etching method using photolithography techniques, thereby forming a counter electrode CT.

Embodiment 3

In the description of Embodiment 3, reference will be made to the counter voltage signal line CL having, for example, a three-layer structure.

Figure 10:
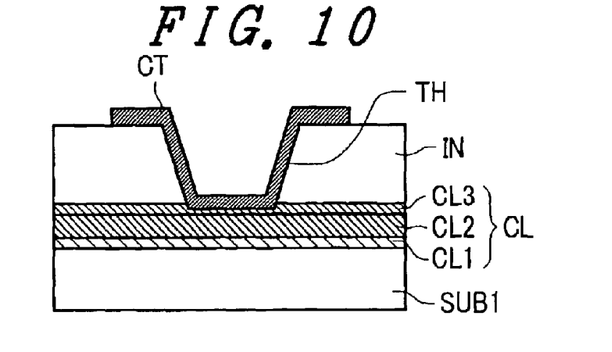
FIG. 10 is a cross-sectional view showing another embodiment of the pixel of the liquid crystal display device according to the invention.

FIG. 10 is a cross-sectional view showing a construction in which the counter voltage signal line CL has a three-layer structure (a first layer CL1, a second layer CL2 and a third layer CL3) and the counter electrode CT is electrically connected to the counter voltage signal line CL through the through-hole TH and others in the insulating film IN which is formed to cover the counter voltage signal line CL (for example, a stacked structure in which the insulating film GI, the protective film PSV1 and protective film PSV2 are stacked in this order).

In the counter voltage signal line CL, the material of the second layer CL2 is made of a material of low resistance, and the material of the second layer CL2 is protected by the materials of the first layer CL1 and the third layer CL3 so that the reliability of the counter voltage signal line CL underlying the insulating film IN is improved.

In this case, it is preferable that the first layer CL1, the third layer CL3 and the second layer CL2 be made progressively larger in film thickness in this order. This is because the second layer CL2 is predominant in determining the interconnection resistance of the counter voltage signal line CL and the electrical resistance of the counter voltage signal line CL can be reduced by increasing the film thickness of the second layer CL2.

The third layer CL3 is provided so that a depressed portion or recess is formed in an exposed portion of the counter voltage signal line CL extending from the through-hole TH of the insulating film IN, and the contact of the counter voltage signal line CL with the counter electrode CT is realized at the bottom and the side wall surface of the depressed portion.

If the depressed portion is to be formed to a sufficiently great depth to provide this contact, it is desirable that the film thickness of the third layer CL3 be made at least twice that of the first layer CL1. With this construction, the area of connection of the counter voltage signal line CL with the counter electrode CT can be made large on the side wall surface of the depressed portion.

In addition, the first and third layers CL1 and CL3 may be made of the same material. In this case, it is possible to obtain a construction which is superior in mass-productivity.

Embodiment 4

Figure 11:
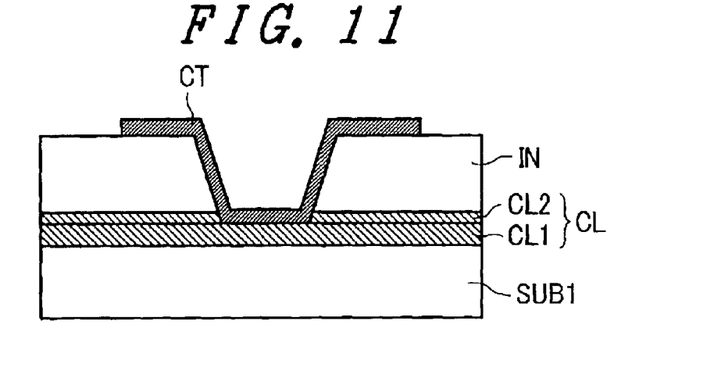
FIG. 11 is a cross-sectional view showing another embodiment of the pixel of the liquid crystal display device according to the invention.

FIG. 11 is a view showing the construction of Embodiment 4 of the liquid crystal display device according to the invention, and corresponds to FIG. 4.

The construction of Embodiment 4 differs from the construction shown in FIG. 4 in that the depressed portion of the counter voltage signal line CL made of a two-layer structure, in which portion the counter voltage signal line CL is connected to the counter electrode CT, is formed to a depth at which the upper surface of the lower layer CL1 is exposed.

In this case as well, since a depressed portion having a comparatively great depth is not formed in the lower conductive layer CL1, it is possible to restrain decrease in the electrical resistance of the lower conductive layer CL1 itself.

It goes without saying that Embodiment 4 can be applied to the case in which the counter voltage signal line CL has a three-layer structure.

Embodiment 5

Figure 12A:
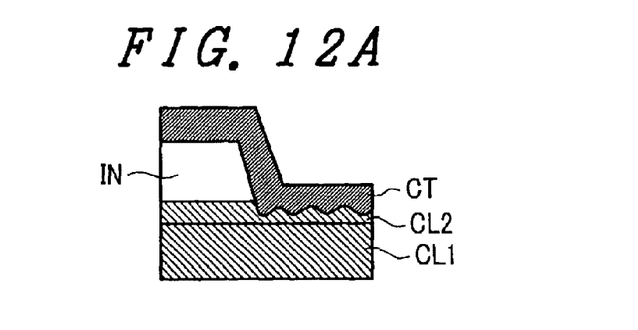
FIG. 12 is a cross-sectional view showing another embodiment of the pixel of the liquid crystal display device according to the invention.

FIG. 12A is a view showing the construction of Embodiment 5 of the liquid crystal display device according to the invention, and corresponds to FIG. 4.

The construction of Embodiment 5 differs from the construction shown in FIG. 4 in that a multiplicity of concave and convex areas are formed in the upper surface of the upper layer CL2 that is connected to the counter electrode CT, the upper layer CL2 being one of two layers which constitute the counter voltage signal line CL.

Figure 12B:
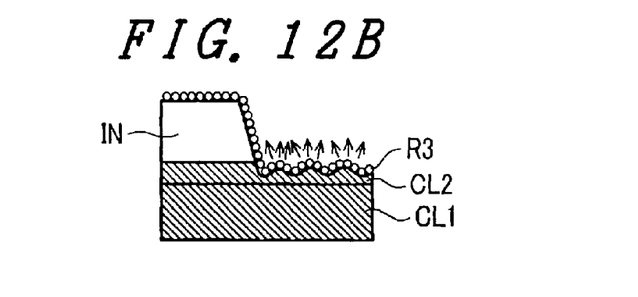

In the case of this construction, the area of contact between the counter voltage signal line CL and the counter electrode CT is increased, whereby the contact resistance therebetween can be improved. In addition, as shown in FIG. 12B, during the formation of the counter electrode CT, since constituent particles R3 can grow in multiple directions, it is possible to restrain step disconnection from occurring in a step portion.

The concave and convex shapes can be formed by a method of intermittently turning on and off the supply of a dry-etching gas during the process of working a metal layer which is to have the concave and convex areas, or a method of modulating the intensity of plasma at the time of dry etching during the process of working a metal layer which is to have the concave and convex areas. In addition, the concave and convex parts can also be formed by unevenly distributing the alloy composition of the sputtering target during the formation of the metal layer to change the alloy composition of the metal layer into various compositions at individual locations, thereby making the dry-etching rate different at individual locations.

Embodiment 6

Figure 13:
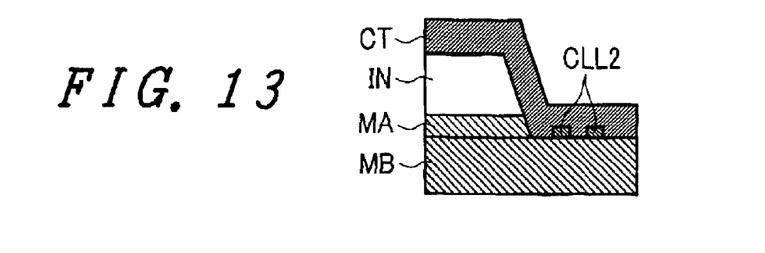
FIG. 13 is a cross-sectional view showing another embodiment of the pixel of the liquid crystal display device according to the invention.

FIG. 13 is a view showing the construction of Embodiment 6 of the liquid crystal display device according to the invention, and corresponds to FIG. 11.

The construction of Embodiment 6 differs from the construction shown in FIG. 11 in that a multiplicity of scattered conductive layers CLL2 each formed in an island-like shape are formed in the portion where the counter voltage signal line CL is connected to the counter electrode CT.

In the case of this construction as well, it is possible to obtain an advantage similar to that obtained in the case where the concave and convex parts are formed on the surface of the counter voltage signal line CL.

Embodiment 7

Embodiment 7 relates to the construction of both the gate signal lines GL and the drain signal lines DL.

Figure 14A:
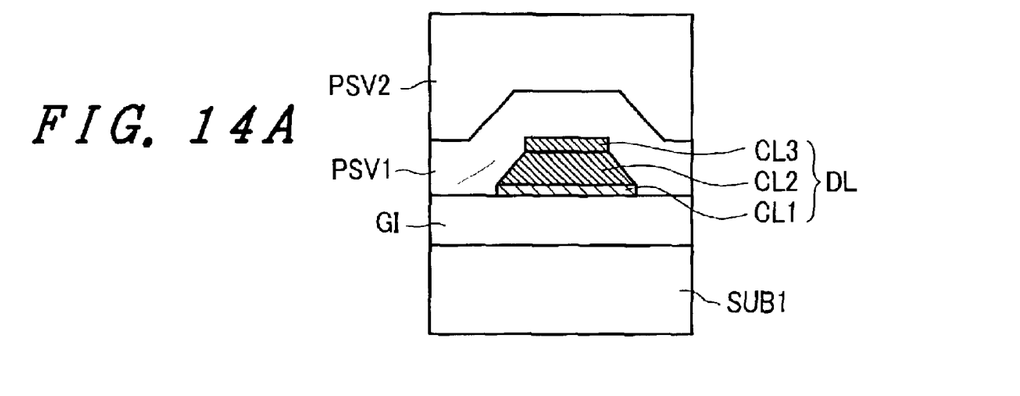
FIG. 14 is a cross-sectional view showing another embodiment of the pixel of the liquid crystal display device according to the invention.

FIG. 14A is a view showing the cross-sectional shape of, for example, one of the drain signal lines DL.

Figure 14B:
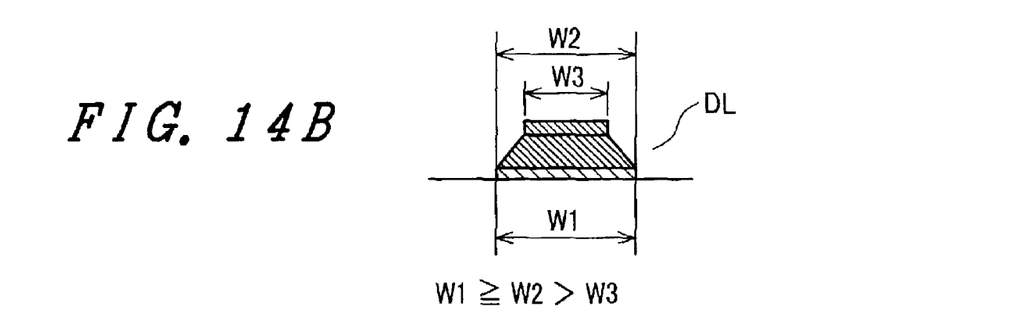

The shown drain signal line DL has a three-layer structure. As shown in FIG. 14B, letting W1 and W2 be, respectively, the width of a lower conductive layer (a first layer) and the width of an upper conductive layer (a third layer), the drain signal line DL has the relationship of W1>W2, and an intermediate conductive layer (a second layer) is formed in a tapered shape so that its width decreases from the lower conductive layer toward the upper conductive layer, i.e., from the width W1 to the width W2.

Figure 14C:
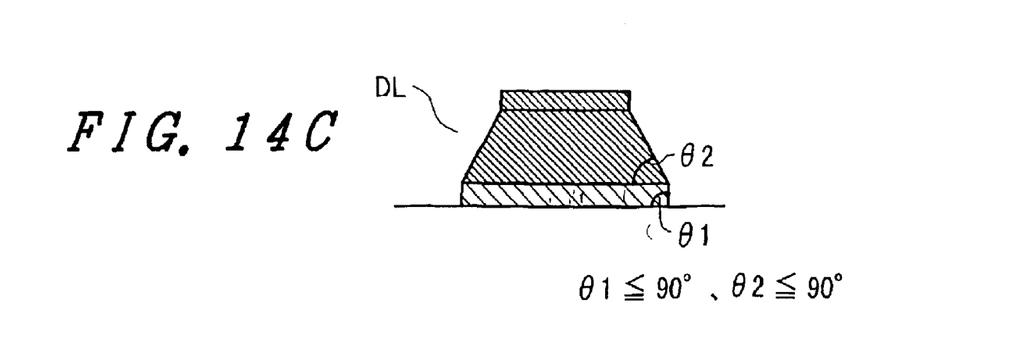

As shown in FIG. 14C, both an angle θ1 of the side wall surface of the lower conductive layer and an angle θ2 of the side wall surface of the intermediate conductive layer are 90° or less.

In this case, if an insulating film is formed to cover the drain signal line DL formed in this manner, a crack does not easily occur in the vicinity of the drain signal line DL in the running direction thereof, and damage due to the crack can be prevented.

To make the advantage of Embodiment 6 clearer, consideration will be given to the case shown in FIG. 15A in which an angle of the side wall surface of the lower conductive layer of a signal line having a three-layer structure is made greater than 90° by side etching during etching, as indicated by FTA in FIG. 15A.

Figure 15A:
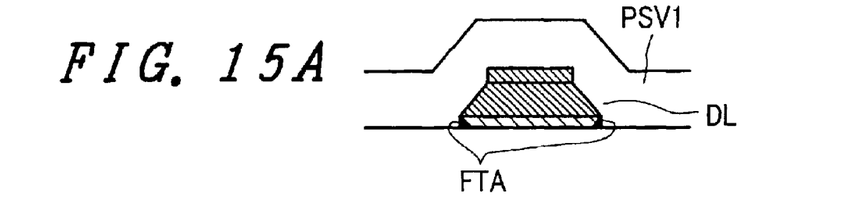
FIG. 15 is an explanatory view showing a problem occurring in a case where the invention is not applied.
Figure 15B:
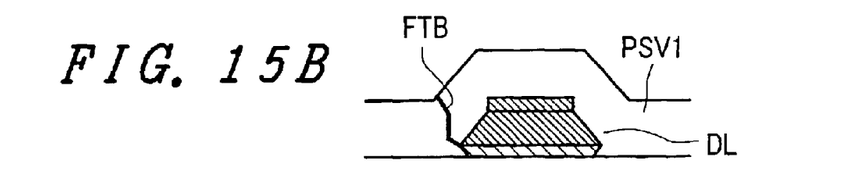

As shown in FIG. 15B, in the case where an insulating film IN is formed to cover the drain signal line DL and others, the side wall of the lower conductive layer of the drain signal line DL is not fully covered with the insulating film IN, so that a crack FTB easily occur in an uncovered portion and extends to the surface of the insulating film IN. This is because air remains in the portion uncovered with the insulating film IN and when the surrounding area is evacuated, the resulting pressure difference applies a large force to the insulating film IN.

Figure 15C:
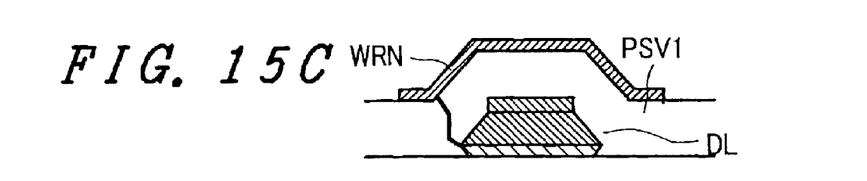
Figure 15D:
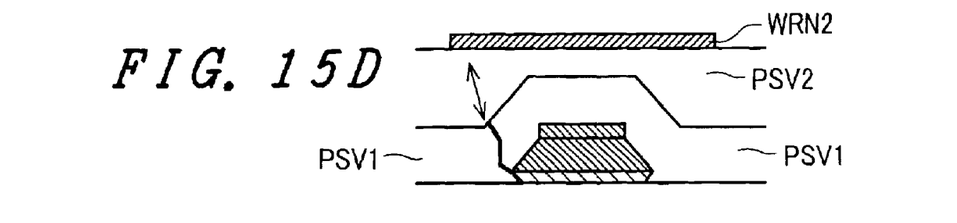

In this case, there is the problem that, as shown in FIG. 15C, in the case where a conductive film WRN is formed on the upper portion of the drain signal line DL with a single-layer insulating film interposed therebetween, a short circuit easily occurs at the location indicated by an arrow in FIG. 15C). In addition, there is the problem that, as shown in FIG. 15D, in the case where a conductive film WRN2 is formed on the upper portion of the drain signal line DL with a two-layer insulating film interposed therebetween, the problem of a degradation of breakdown voltage is caused through a crack in the portion of FIG. 15D in which a double-headed arrow is shown. As a result, leakage current increases and power consumption increases.

In the case of the pixel shown in FIG. 3, the above-described problem occurs between either the gate signal lines GL and the overlying counter electrode CT or between the drain signal lines DL and the overlying counter electrode CT.

The drain signal line DL shown in FIG. 15A can be formed by selecting the material of each of the upper and lower metal layers so that the etching rate of the lower metal layer becomes smaller than that of the upper metal layer. In particular, it is preferable that the wet etching rates of the respective upper and lower metal layers satisfy such a relationship.

In this case, when a through-hole which exposes a part of the drain signal line DL is to be formed by dry etching in the insulating film which covers the drain signal line DL, it is desirable that a material having resistance to dry etching be selected for the upper metal layer.

For example, MoCr is suited to the metal of the first layer, Al-based metal to the metal of the second layer, and MoZr to the metal of the third layer. In this case, for example, AlNd can be used as the Al-based metal of the second layer.

Embodiment 8

Figure 16:
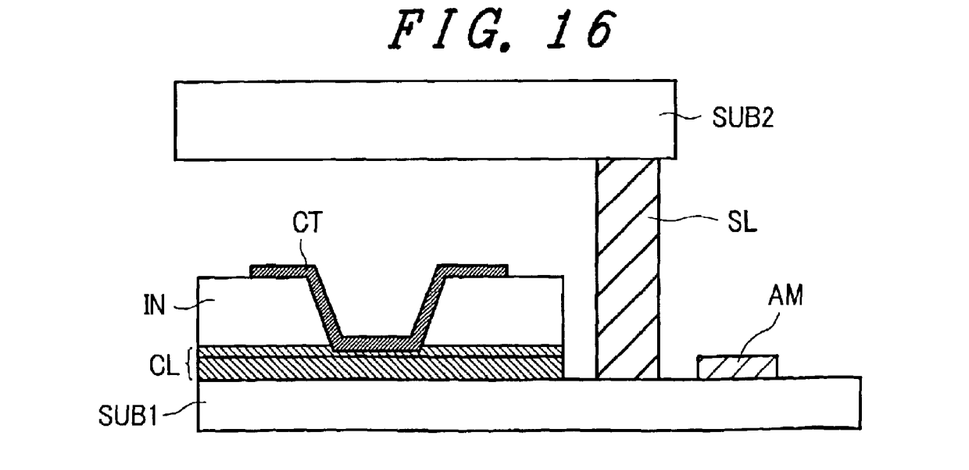
FIG. 16 is a view showing the construction of another embodiment of the liquid crystal display device according to the invention.

FIG. 16 is a view showing the construction of Embodiment 8 of the liquid crystal display device according to the invention, and corresponds to a cross-section taken along XVI—XVI in FIG. 11.

In Embodiment 8, for example in the case where the counter voltage signal line CL is made of a two-layer structure as described above and low-resistance Al or an alloy thereof is used for a lower layer, an alignment mark AM is formed on, for example, the surface of the transparent substrate SUB1 outside the sealing material SL at the same time as the formation of the lower layer.

Since Al has a high reflectance, a read error does not easily occur when the alignment mark AM is recognized through light reflected from the alignment mark AM.

In this case, when drying etching for forming a through-hole in an insulating film is to be effected to form a depressed portion or recess in the upper metal layer to provide connection between the counter voltage signal line CL and the counter electrode CT, the diameter of the depressed portion or recess is extremely small and the speed of etching of the depressed portion is slow.

On the other hand, even in the case where the alignment mark AM is formed of a two-layer structure similarly to the counter voltage signal line CL, the upper metal layer of the alignment mark AM is removed during dry etching, and a surface of Al or an alloy thereof is exposed. This is because the alignment mark AM having an area as large as a pixel area is easily exposed to dry-etching gas and the speed of etching of the alignment mark AM is relatively fast.

Embodiment 9

In the description of each of Embodiments 1 to 8, reference has been made to a so-called horizontal electric field type of liquid crystal display device, but it goes without saying that the invention can also be applied to a vertical electric field type of liquid crystal display device.

Figure 17A:
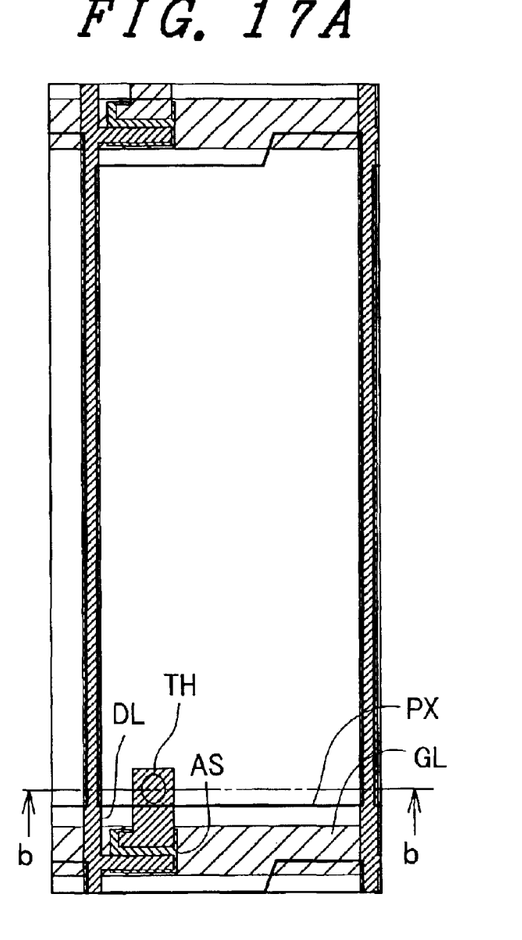
FIG. 17 is a view showing the construction of another embodiment of the liquid crystal display device according to the invention.
Figure 17B:
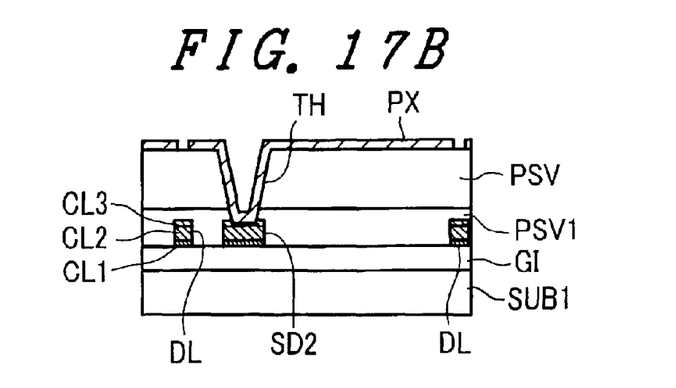

FIG. 17A is a plan view showing one embodiment of a pixel of a so-called vertical electric field type of liquid crystal display device, and corresponds to FIG. 3. In FIG. 17A, portions denoted by the same reference numerals as those shown in FIG. 3 are made of the same materials and the same functions as those of the corresponding portions shown in FIG. 3. FIG. 17B is a cross-sectional view taken along line b—b of FIG. 17A.

The difference between Embodiment 9 and the construction shown in FIG. 3 resides in the pixel electrode PX. The pixel electrode PX shown in FIG. 17A is formed to cover a large part of the pixel area on the protective film PSV2, and is formed of an optically transmissive material made of, for example, ITO (Indium Tin Oxide), ITZO (Indium Tin Zinc Oxide) or IZO (Indium Zinc Oxide).

This pixel electrode PX is connected to the source electrode SD2 of the thin film transistor TFT through the through-hole TH formed to extend through the protective films PSV2 and PSV1.

In this case, a depressed portion or recess is formed in the portion of the source electrode SD2 that is connected to the pixel electrode PX, and the source electrode SD2 is formed to have, for example, a three-layer structure.

The pixel electrode PX is arranged to cause electric fields to be generated perpendicular to the opposing transparent substrate SUB2 between the pixel electrode PX and a counter electrode made of an optically transmissive material and formed in common with each pixel area on the liquid crystal-facing surface of the transparent substrate SUB2.

In addition, the invention is not limited to a through-hole in a pixel area, and can also be applied to the contact of a terminal portion to realize stable conductive connection.

As is apparent from the foregoing description, in accordance with the liquid crystal display device according to the invention, contact through a through-hole can be made reliable.

What is claimed is:

1. A liquid crystal display device comprising:
   a first conductive film;
   at least one insulating film formed to cover the first conductive film; and
   a second conductive film formed on an upper surface of the at least one insulating film;
   wherein the first conductive film, the at least one insulating film and the second conductive film are formed on a liquid crystal-facing surface of at least one of a pair of substrates disposed in opposition to each other with a liquid crystal layer interposed therebetween;

wherein a part of the second conductive film is electrically connected to the first conductive film through a through-hole formed in the at least one insulating film;

wherein the first conductive film has a recess formed in a portion thereof which is connected to the second conductive film; and wherein the first conductive film is made of a three-layer structure, the recess being formed in an uppermost layer of the three-layer structure, and an intermediate layer provided between the uppermost layer and a lowermost layer being formed of a conductive layer which is lower in electrical resistance than an electrical resistance of the uppermost and lowermost layers.

2. A liquid crystal display device according to claim 1, wherein the three layers of the first conductive film are formed to be progressively thicker in the order of the lowermost layer, the uppermost layer and the intermediate layer.

3. A liquid crystal display device according to claim 2, wherein the lowermost layer and the uppermost layer of the first conductive film are formed of the same material.

4. A liquid crystal display device comprising on a liquid crystal-facing surface of one of a pair of substrates disposed in opposition to each other with a liquid crystal interposed therebetween:

a plurality of gate signal lines disposed in juxtaposition;

a plurality of drain signal lines juxtaposed to intersect the gate signal lines; and pixel areas surrounded by adjacent gate signal lines and adjacent drain signal lines;

wherein each of the pixel areas has a thin film transistor enabled by a scanning signal from one of the adjacent gate signal lines, a pixel electrode is supplied with a video signal from one of the adjacent drain signal lines via the thin film transistor, at least one insulating film covers at least the pixel electrode, and a counter electrode is connected to a counter voltage signal line so as to generate an electric field between the counter electrode and the pixel electrode, and wherein the counter voltage signal line is formed in a lower portion of the at least one insulating film, and the counter electrode is formed in an upper portion of the at least one insulating film and is electrically connected to the counter voltage signal line through a through-hole formed in the at least one insulating film, the counter voltage signal line having a recess formed in a portion thereof connected to the counter electrode.

5. A liquid crystal display device according to claim 4, wherein the first conductive film is made of at least a two-layer structure, the recess being formed in an upper conductive film of the at least two-layer structure, and a lower conductive film of the at least two-layer structure being made of a material having a lower electrical resistance than an electrical resistance of the upper conductive film.

6. A liquid crystal display device according to claims 4, wherein the first conductive film is made of a three-layer structure, the recess being formed in an uppermost layer of the three-layer structure and an intermediate layer between the uppermost layer and a lowermost layer being formed of a conductive layer lower in electrical resistance than the uppermost and lowermost layers.

7. A liquid crystal display device according to claim 6, wherein the three layers of the first conductive film are formed to be progressively thicker in the order of the lowermost layer, the uppermost layer and the intermediate layer.

8. A liquid crystal display device according to claim 7, wherein the lowermost layer and the uppermost layer of the first conductive film are formed of the same material.

9. A liquid crystal display device according to claim 4, wherein the recess is a depressed portion formed in the first conductive film.

* * * * *